US012171055B2

(12) United States Patent
McCahon et al.

(10) Patent No.: US 12,171,055 B2
(45) Date of Patent: Dec. 17, 2024

(54) PULSED LASER THERMAL EXCITATION

(71) Applicant: APPLIED ENERGETICS, INC, Tucson, AZ (US)

(72) Inventors: Stephen William McCahon, Tucson, AZ (US); Gregory J. Quarles, Tucson, AZ (US)

(73) Assignee: APPLIED ENERGETICS, INC., Tucson, AZ (US)

( * ) Notice: Subject to any disclaimer, the term of this patent is extended or adjusted under 35 U.S.C. 154(b) by 481 days.

(21) Appl. No.: 17/651,128

(22) Filed: Feb. 15, 2022

(65) Prior Publication Data

US 2022/0264736 A1 Aug. 18, 2022

Related U.S. Application Data

(60) Provisional application No. 63/156,672, filed on Mar. 4, 2021, provisional application No. 63/149,444, filed on Feb. 15, 2021.

(51) Int. Cl.
*H05H 1/46* (2006.01)

(52) U.S. Cl.
CPC .................................... *H05H 1/46* (2013.01)

(58) Field of Classification Search
CPC ................................ H05H 1/46; F41H 13/005
USPC ................................. 372/9, 23, 29.023, 109
See application file for complete search history.

(56) References Cited

U.S. PATENT DOCUMENTS 7,050,469 B1 * 5/2006 Lundquist ............. G02F 1/3511 372/9

OTHER PUBLICATIONS

Hashemipour, et al., "The Effect of Atmosphere Disturbances on Laser Beam Propagation," Key Engineering Materials, vol. 500, Aug. 2012, Trans Tech Publications, Switzerland, pp. 3-8.
Mahdieh, "Numerical Approach to Laser Beam Propagation Through Turbulent Atmosphere and Evaluation of Beam Quality Factor," Optics Communications 281 (2008), Elsevier B.V., pp. 3395-3402.
Reierson, "Analysis of Atmospheric Turbulence Effects on Laser Beam Propagation Using Multi-Wavelength Laser Beacons," Thesis Submitted to The School of Engineering of the University of Dayton, Dayton Ohio, Dec. 2011.
RP Photonics Encyclopedia, definition for "Self-Focusing", URL https://www.rp-photonics.com/self_focusing.html, accessed Jan. 31, 2022.

* cited by examiner

*Primary Examiner* — Michael Maskell
(74) *Attorney, Agent, or Firm* — Michael C. Martensen; Martensen IP

(57) ABSTRACT

At a designated range an ultra-short pulse laser beam collapses focusing its power and thereby creating a plasma. A range specific thermal plasma is formed from a pulsed laser configured to produce a pulsed wavefront at a peak power. The peak power of the wavefront exceeds a self-focusing critical power level. An optical wavefront controlling element having one or more optical lens manipulates the pulsed wavefront based on a ratio of the peak power to the self-focusing critical power level, and an atmospheric condition, initiating whole beam collapse at the designated range.

25 Claims, 13 Drawing Sheets

PULSED LASER THERMAL EXCITATION

RELATED APPLICATION

The present application relates to and claims the benefit of priority to U.S. Provisional Patent Application No. 63/149,444 filed 15 Feb. 2021 and U.S. Provisional Patent Application No. 63/156,672 filed 4 Mar. 2021 which are hereby incorporated by reference in their entirety for all purposes as if fully set forth herein.

BACKGROUND OF THE INVENTION

Field of the Invention

Embodiments of the present invention relate, in general, to manipulations of electric or magnetic fields, wave energy or particle radiation and more particularly to the use of pulsed lasers to create laser induced plasma.

Relevant Background

A laser is a device that emits light through a process of optical amplification based on the stimulated emission of electromagnetic radiation. The word “LASER” is an acronym for “Light Amplification by Stimulated Emission of Radiation”. A laser differs from other sources of light in that it emits light which is coherent. Spatial coherence allows a laser to be focused to a tight spot, enabling applications such as laser cutting and lithography. Spatial coherence also allows a laser beam to stay narrow over great distances (collimation), enabling applications such as laser pointers and LIDAR. Lasers can also have high temporal coherence, which allows them to emit light with a very narrow spectrum. Alternatively, temporal coherence can be used to produce ultrashort pulses of light with a broad spectrum but durations as short as a femtosecond.

As mentioned above, lasers are distinguished from other light sources by their coherence. Spatial (or transverse) coherence is typically expressed through the output being a narrow beam, which is diffraction-limited. Laser beams can be focused to very tiny spots, achieving a very high irradiance, or they can have very low divergence to concentrate their power at a great distance. Temporal (or longitudinal) coherence implies a polarized wave at a single frequency, whose phase is correlated over a relatively great distance (the coherence length) along the beam. A beam produced by a thermal or other incoherent light source has an instantaneous amplitude and phase that vary randomly with respect to time and position, thus having a short coherence length.

Lasers are also characterized according to their wavelength. Most “single wavelength” lasers produce radiation in several modes with slightly different wavelengths. Although temporal coherence implies some degree of monochromaticity, there are lasers that emit a broad spectrum of light or emit different wavelengths of light simultaneously.

One aspect of a laser is its ability to form plasma. Plasma is one of the four fundamental states of matter. It contains a significant portion of charged particles—ions and/or electrons. The presence of these charged particles is what primarily sets plasma apart from the other fundamental states of matter. Laser-Induced Plasmas (LIP) can be formed by focusing a laser pulse of appropriate irradiance on a portion of matter, thus vaporizing, atomizing, and ionizing the material at the irradiated spot. (Irradiance is defined as the power deposited per unit area and measured in $W/cm^2$)

The laser beam instantly ionizes the atoms when it interacts with the solid or gaseous material . . . . This ionized state is referred to as plasma.

Plasma is also formed when atmospheric gases are ionized—electrons are separated from their atoms—by the heat and compression caused by an object moving through the air at many times the speed of sound. Hypersonic vehicles and weapons form a plasma sheath while flying at more than five times the speed of sound through the atmosphere. Because of the short timeframe available to identify and react to hypersonic vehicles, a need exists to detect, identify, and, if necessary, interdict such vehicles. Launching a conventional weapon to defeat such an incoming threat is not a viable solution because of the conventional weapon’s relatively slow speed and its inability to adjust to a maneuvering threat. Counteracting such hypersonic weapons thus requires a more responsive engagement.

What is needed, and is lacking in the current art, is a versatile and effective means by which to detect and, when necessary, interact with a hypersonic vehicle generated plasma field. These and other deficiencies of the prior art are addressed by one or more embodiment of the present invention. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

At a designated range an ultra-short pulse laser beam collapses focusing its power and thereby creating a plasma. In one embodiment of the present invention, a system for generating a range specific thermal plasma, includes a pulsed laser configured to produce a pulsed wavefront at a peak power. The peak power of the wavefront exceeds a self-focusing critical power level. The system further includes an optical wavefront controlling element having one or more optical lens configured to diverge (converge) the pulsed wavefront based on a ratio of the peak power to the self-focusing critical power level, and an atmospheric condition thereby initiating whole beam collapse at a designated range.

Other features of a system for generating a range specific thermal plasma include that the plasma generation emits a secondary radiation. This radiation can be received and used by wavefront controlling element to modify the one or more optical lens refining formation of the plasma or the generation of the USP laser wavefront itself, again refining the location of whole beam collapse. Another feature of the present invention is selecting a combination of a USP laser wavefront having sufficient peak power to self-focus using known or observed atmospheric conditions. In some instances, whole beam collapse can be directed at ranges of 100 km or more. The ratio between the peak power of the USP laser and the critical power is greater than 1 but may vary from 1 to 20 or more.

The plasma formed by the present invention can disrupt, according to one embodiment, airflow surrounding an object such as a hypersonic vehicle producing sufficient forces to disable or disrupt the hypersonic vehicle.

A method for generating a range specific thermal plasma begins by producing a pulsed laser wavefront by a pulsed laser wherein the pulsed laser wavefront has a peak power exceeding a self-focusing critical power level. The process continues by controlling one or more optical lens in an optical wavefront by a controlling element to diverge, or in some cases converge, the pulsed wavefront based on a ratio of the peak power to the self-focusing critical power level and a known or observed atmospheric condition. These steps lead to initiating whole beam collapse of the pulsed laser wavefront at a designated range.

The whole beam collapse forms a plasma at the designated range upon interaction with an object. This interaction between the plasma and the object emits a secondary radiation that is received and analyzed by a system controller. Using this information, the system controller, communicating with the wavefront controlling element, can modify the one or more optical lens thereby refining the location (range) at which whole beam collapse occurs. Similarly, the system controller, using data from the emitted secondary radiation, can modify the generation of the USP laser wavefront itself, again refining the location (range) at which whole beam collapse occurs. In one instance the ratios of the peak power to the critical power level can be refined. The ratio of peak power to critical power may vary from 1 to more than 20. And the wavelength of the USP laser may vary from 10 um or less with a peak power greater than the critical power.

Using these steps, the plasma formed by the present invention can disrupt airflow surrounding an object such as a hypersonic vehicle. In some cases, the formation of plasma by the present invention, and interaction with other objects, can occur at ranges up to or greater than 100 km. This interaction can create forces disruption established plasma sheaths and/or shock waves debilitating/interdicting the object.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
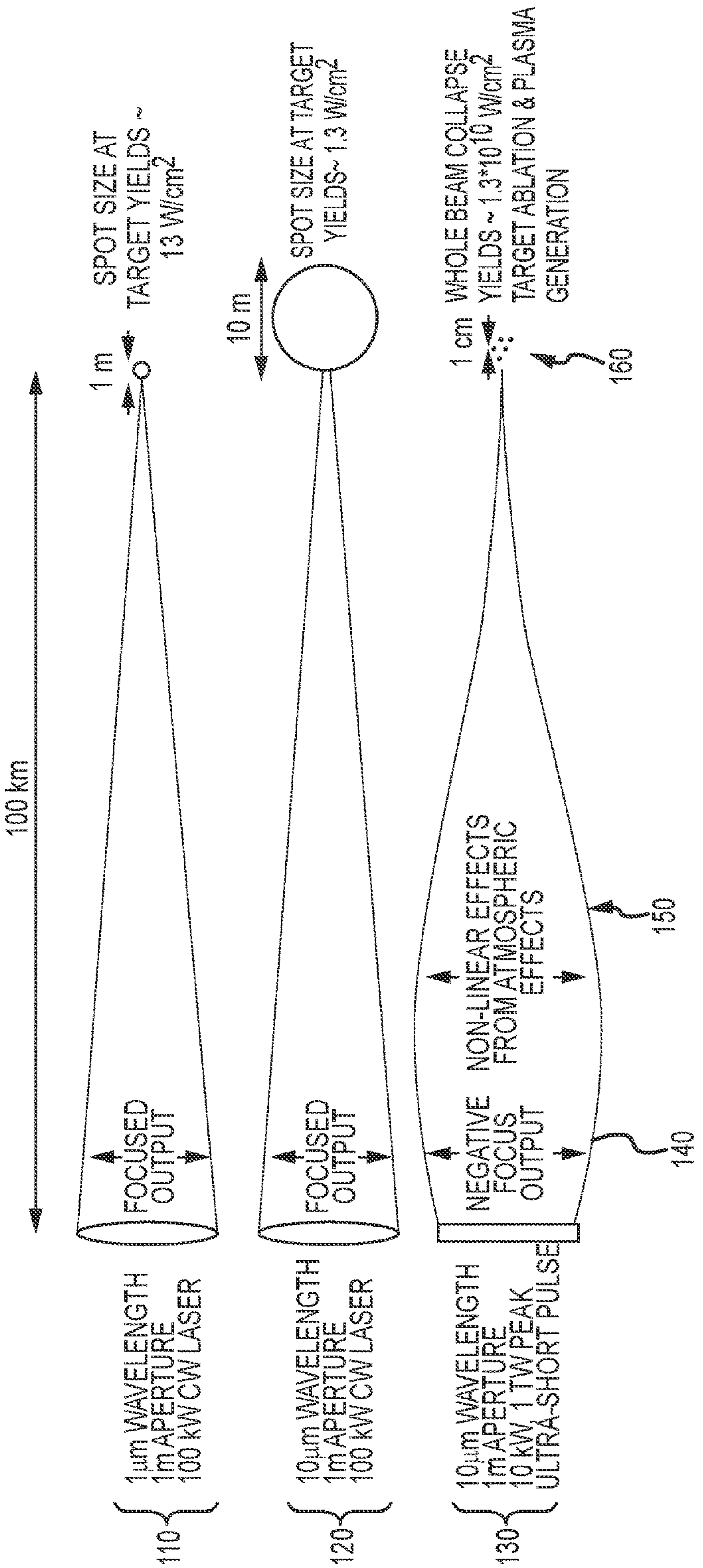
FIG. 1 highlights the differences between atmospheric propagation of Continuous Wave (CW) 1 μm and 10 μm, and 10 μm USP lasers to a target located at 100 km, according to one embodiment of the present invention.

The Figures depict embodiments of the present invention for purposes of illustration only. Like numbers refer to like elements throughout. In the figures, the sizes of certain lines, layers, components, elements, or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

A range specific thermal plasma is generated using a pulsed laser. The pulsed laser is configured to produce a pulsed wavefront at a peak power exceeding the self-focusing critical power level for a particular (known) atmospheric condition. An optical wavefront controlling element having one or more optical lens diverges (converges) the pulsed wavefront within known atmospheric conditions thereby initiating whole beam collapse at a designated range. The interaction of the focused wavefront forms a plasma that interacts within one embodiment, a hypersonic vehicle formed plasma, disrupting aerodynamic stability of the vehicle.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

By the term "plasma" it is meant, in physics, an electrically conducting medium in which there are roughly equal numbers of positively and negatively charged particles, produced when the atoms in a gas become ionized. It is sometimes referred to as the fourth state of matter, distinct from the solid, liquid, and gaseous states. The uniqueness of the plasma state is due to the importance of electric and magnetic forces that act on a plasma in addition to such forces as gravity that affect all forms of matter. Since these electromagnetic forces can act at large distances, a plasma will act collectively much like a fluid even when the particles seldom collide with one another.

By the term "divergent" or "diverge" it is meant to move or extend in different directions from a common point: draw apart. It also has the meaning of moving or extending in different directions from a common point: diverging from each other; causing rays to draw apart from a common center such as from a divergent lens.

By the term "wavefront" it is meant, in physics, a time-varying field of a set (locus) of points where the wave has the same phase of the sinusoid. The term is generally meaningful only for fields that, at each point, vary sinusoidally in time with a single temporal frequency (otherwise the phase is not well defined). Wavefronts usually move with time. For waves propagating in a unidimensional medium, the wavefronts are usually single points; they are curves in a two dimensional medium, and surfaces in a three-dimensional one.

By the term "peak power" it is meant as the maximum optical power a laser pulse will attain. In more loosely defined terms, it is an indicator of the amount of energy a laser pulse contains in comparison to its temporal duration, namely pulse width.

By the term "self-focusing critical power" it is meant focusing of a beam in a transparent medium, caused by the beam itself through a nonlinear process in the medium. An intense light pulse propagating in a nonlinear medium can experience nonlinear self-focusing; the beam radius is decreased compared with that of a weak pulse. The higher optical intensities on the beam axis, as compared with the wings of the spatial intensity distribution, cause an effectively increased refractive index for the inner part of the beam. That modified refractive index distribution then acts like a focusing lens.

By the term "whole beam collapse" it is meant as self-induced nonlinear focusing of a laser beam induced by the change in refractive index of materials exposed to intense electromagnetic radiation, also known as the Kerr effect. Whole beam collapse is meant to describe the physical condition of a laser beam at the onset of optical filamentation. A medium whose refractive index increases with the electric field intensity acts as a focusing lens for an electromagnetic wave characterized by an initial transverse intensity gradient, as in a laser beam. The peak intensity of the self-focused region keeps increasing as the wave travels through the medium, until defocusing effects or medium damage interrupt this process. Self-focusing occurs if the radiation power is greater than the critical power.

$$P_{cr} = \alpha \frac{\lambda^2}{4\pi n_0 n_2}$$

where λ is the radiation wavelength in vacuum and a is a constant which depends on the initial spatial distribution of the beam. Although there is no general analytical expression for α, its value has been derived numerically for many beam profiles.

By the term "secondary radiation" it is meant radiation originating from the absorption of previous radiation in matter. It may be in the form either of electromagnetic waves or of moving particles.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to generate a range specific thermal plasma. In the following description, it will be understood that each block of the flowchart illustrations, and combinations of blocks in the flowchart illustrations, may be implemented and supplemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

The blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware, firmware and/or hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Overview

Long wavelength (10-micron) Ultra-Short Pulse (USP) laser effects of one embodiment of the present invention form a range specific plasma that can defeat incoming hypersonic vehicles (HSVs). By generating and placing plasma on or near the surface of an incoming high velocity threat, the plasma disrupts the existing plasma field and/or shockwave around the vehicle causing the vehicle's flight dynamics to become unstable.

In one embodiment of the present invention, the atmosphere is used to propagate the USP laser through a balancing of a non-linear self-focusing effect with diffraction to create a "whole beam collapse" at or near the target. The self-focusing concentrates the beam producing much greater energy densities at the target compared to linear propagation. The USP laser of the present invention uses a precision beam control system to affect the hypersonic flow field around the incoming threat by generating a plasma at or near the target. The newly generated plasma disturbs the shockwave that has set up around the surface of the skin of the target. This disruption generates unbalanced forces causing the vehicle to go unstable, tumble, and render the hypersonic vehicle uncontrollable.

The USP laser system of the present invention uses atmospheric focusing. FIG. 1 highlights the differences between atmospheric propagation of Continuous Wave (CW) 1 μm 110 and 10 μm 120, and 10 μm 130 USP lasers to a target located at 100 km. The USP system balances the diffraction 140 with non-linear atmospheric effects 150 to achieve the required energy density 160 near the target to create a large scale "Whole Beam Collapse" (WBC). During the process of WBC, a process referred to as "Filamentation" can occur. Filamentation is created by a balance of atmospheric self-focusing to both normal diffraction and defocusing caused by ionization of the air, and subsequent atmospheric plasma creation. Filaments act as waveguides for the laser, thus preventing normal diffraction and divergence, thereby creating very high intensities. Filamentation can be helpful in certain circumstances but is not necessarily required for the current invention. Whole beam collapse creates extremely high energy intensities at the target that can ablate material and generate high density plasmas. The plasma densities from ablated solid materials are generally much higher than atmospheric plasmas generated by filaments.

One embodiment of the present invention uses an USP laser of a 1 TW peak power or more to defeat incoming hypersonic weapons. The present invention includes a USP laser source, power supply, thermal control, and an optical wavefront controlling element.

Figure 2:
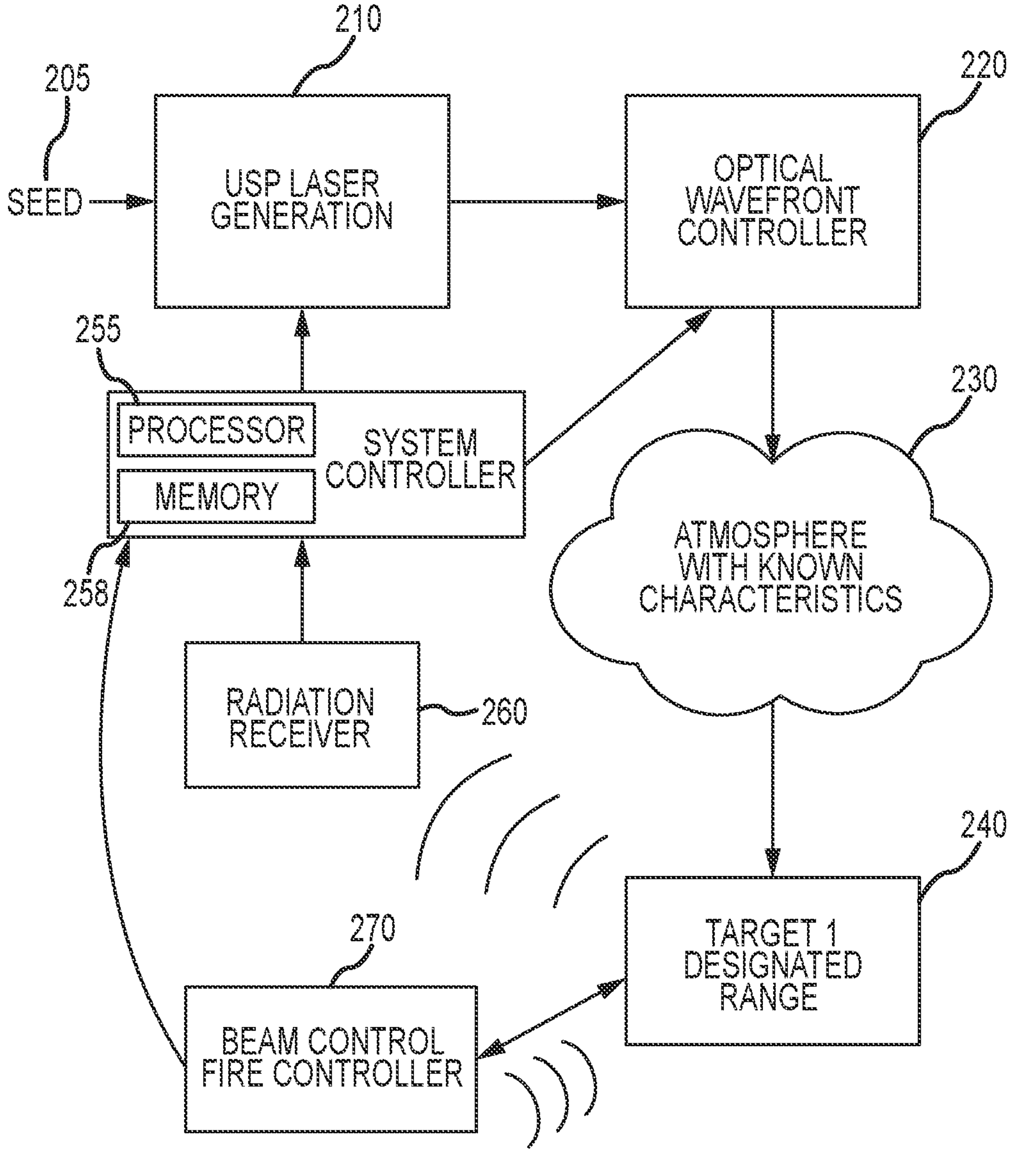
FIG. 2 shows an example of a USP laser system architecture for forming a collapsed ultra-short pulse laser beam at a designated range according to one embodiment of the present invention.

FIG. 2 shows an example of a USP laser system architecture for producing a collapsed USP laser beam at a designated range according to one embodiment of the present invention. From a seed signal 205, an ultra-short pulse laser is produced, by a USP laser generation system 210, having a peak power that exceeds the critical power for atmospheric self-focusing. In one embodiment of the present invention a 10-micron wavelength pulsed laser with a peak power of 1 TW is directed toward an optical wavefront controller 220. The optical wavefront controller includes two or more lens or mirrors configured to focus or diverge the wavefront according to commands from a system controller 250.

The system controller 250, coupled to the USP laser generation system 210 and the optical wavefront controller 220 includes a processor 255 as well as a memory 258 for data suitable for the control of the USP laser generation system 210 and the optical wavefront controller 220 as well as data of atmosphere conditions such as density and atmospheric turbulence at various altitudes. The system controller is also coupled with a beam control fire controller 270 that provides data and directional information as to the location of the target 240.

The USP laser system architecture of the present invention utilizes known characteristics of the atmosphere 230 through which the USP laser travels. As discussed herein, the USP laser, having a peak power that exceeds the critical power, self focuses within the atmosphere ultimately resulting in whole beam collapse. As the USP laser interacts with the target 240 at a designated range, secondary radiation is emitted that is detected by a radiation receiver 260. The secondary radiation is interpreted by the system controller 205 which thereafter modifies the USP laser power and other characteristics by the USP laser generation system 210 and/or the lens within the optical wavefront controller 220.

Parameters for each subsystem regarding performance; size, weight, and power (SWaP); and interface requirements are used to determine a baseline laser system, based on subsystem engineering tradeoffs to identify subsystems requiring modification or replacement for compatibility with notional mobile platforms, such as aircraft or terrestrial vehicles.

Beam Control Fire Control (BCFC) Technology

One aspect of the present invention it to engage a desired target at long ranges. BCFC system technology enables the USP Laser of the present invention to implement various techniques to initiate whole beam collapse at a desired range as directed to a desired target. In one version of the present invention, the USP laser has the following general characteristics: a 10-micron wavelength, which makes aperture-sharing easier, in most cases; a high peak power (in terawatts [TW]) and low average power (1 to 10 kW); and capability against both low- and high-velocity targets.

The USP laser can also have sub-meter class apertures even with a relatively longer CO2 wavelength and still provide a required laser spot size at range. This permits the relaxing of sub-μ-radian directed-energy (DE) beam-pointing requirements to a 5 to 10μ-radian domain, while still applying the necessary effects on the HSV target. Beam-pointing to this precision utilizes inertial beam stabilization and tracking. Further, aero heating of the HSV in the atmosphere results in a high thermal signature and a signal-to-noise ratio (SNR) sufficient for passive-only tracking system architecture.

While a worst case, target-crossing velocities may not stress existing gimbal rates or acceleration technology for ranges above 5 km, even for meter-class optics, they do result in an anisoplanatic lead-ahead angle on the laser relative to the fine tracker line-of-sight, of approximately 8 milliradians (mrad). In one embodiment, long focal length Mersenne telescopes, typically used in DE systems, designed with field-of-view (FOV) of 1 mrad or less, minimize spherical aberration on the outgoing laser beam.

The tracking system of the present invention can be implemented as either a shared aperture or as a separate aperture system. The 8 mrad of off-axis laser pointing requires either a higher FOV shared aperture design or a separate aperture tracker slaved laser transmitter approach. A shared aperture system, with a large FOV of this size, may require a non-traditional optical form such as a three-mirror anastigmat (TMA). Many of these designs are off-axis telescopes with no central obscuration, features conducive to aiding the large peak power waveforms of the USP laser.

Long Range Nonlinear Propagation of IR USP Lasers

The USP laser system of the present invention generates a laser-induced plasma (perturbation) proximate to HSV air flow/plasma sheath (if one exists)/shockwave with forces sufficient to cause catastrophic flight instabilities and/or disable the HSV's propulsion systems. These effects are achieved by producing plasma/air shock waves in front and/or along the length of the target; directly coupling laser energy to the plasma sheath surrounding the HSV; or ablating the target's surface for direct plasma-material injection into the plasma sheath. Additionally, each of the above processes and related system requirements can be enhanced by rapid burst mode and repetitive USP laser effects.

Engagement ranges for a target (HSV) range from 10 km to greater than 100 km and at altitudes ranging from near sea level to multi-tens of kilometers. Traditional linear focusing of lasers at these ranges produce diffraction limited minimum spot sizes in the meter diameter class. High peak intensities and fluence levels necessary to engage HSV targets require the controllable nonlinear focusing and long-range propagation mechanism of the present invention.

Recall that optical filaments are formed when high peak-power laser pulses lead to a positive atmospheric self-focusing of the beam, which in turn leads to very high intensity multi-photon absorption and a resultant plasma. The plasma then acts in a defocusing manner. This competition between atmospheric focusing, diffraction, and plasma defocusing typically leads to thin (~100 μm diameter for 0.8 μm wavelength light), self-trapped optical filaments that do not diffract and can be several meters long. Importantly, for the case of 10 μm wavelength light, the optical filament diameter is on the order of 1 cm; can exist for many tens of meters; has a clamped peak intensity of approximately $10^{12}$ $W/cm^2$; and can contain J-class energies.

Operating at 10 μm compared to 1 μm generally allows for reduced absorption, scattering, turbulence effects, and dispersion. Although a much larger critical power is required for self-focusing, the desired energy delivery and whole beam collapse can still be accomplished using USPs at the TW class peak power level. Additionally, scaling with altitude provides further benefits of increase in the critical power linearly with decreasing air density, along with decreased absorption, scattering, and turbulence.

Long Wave Infrared (LWIR) USP Propagation

Each aforementioned HSV defeat mechanism requires different laser parameters, optical launch conditions, and final beam formation (collapse) at the target. For instance, the generation of plasmas regions ahead of or near the vehicle requires peak intensities sufficient to form whole beam collapse/optical filaments and strong ionization of the air. The case of coupling laser energy directly to the targets existing plasma sheath does not require optical filament formation but does require high-density energy absorption within the existing plasma. For the case of target material ablation, the laser ablation threshold intensity must be exceeded, but even the injection of relatively high-density material into the plasma sheath and resultant perturbation is a significant energetic effect.

High pressure USP CO2 lasers, according to one embodiment of the present invention, operating near 10 μm increases transmission viability and critical power while reducing turbulence effects and dispersion. Compared to the Near InfraRed (NIR), USP CO2 lasers provide stronger interactions with plasma via larger pondermotive forces. The primary nonlinear processes in air include atmospheric self-focusing, multi-photon absorption for NIR and many body effects for LWIR, plasma generation/recombination and defocusing, self-phase modulation, and rotational Raman scattering. The linear optical processes include extinction, turbulence, diffraction, and dispersion. The present invention identifies onset of whole beam collapse (pre-filamentation), aka to as the self-focusing distance (SFD), for key system and atmospheric parameters by using closed form engineering equations for SFD in lossy, turbulent, nonlinear media.

Figure 3A:
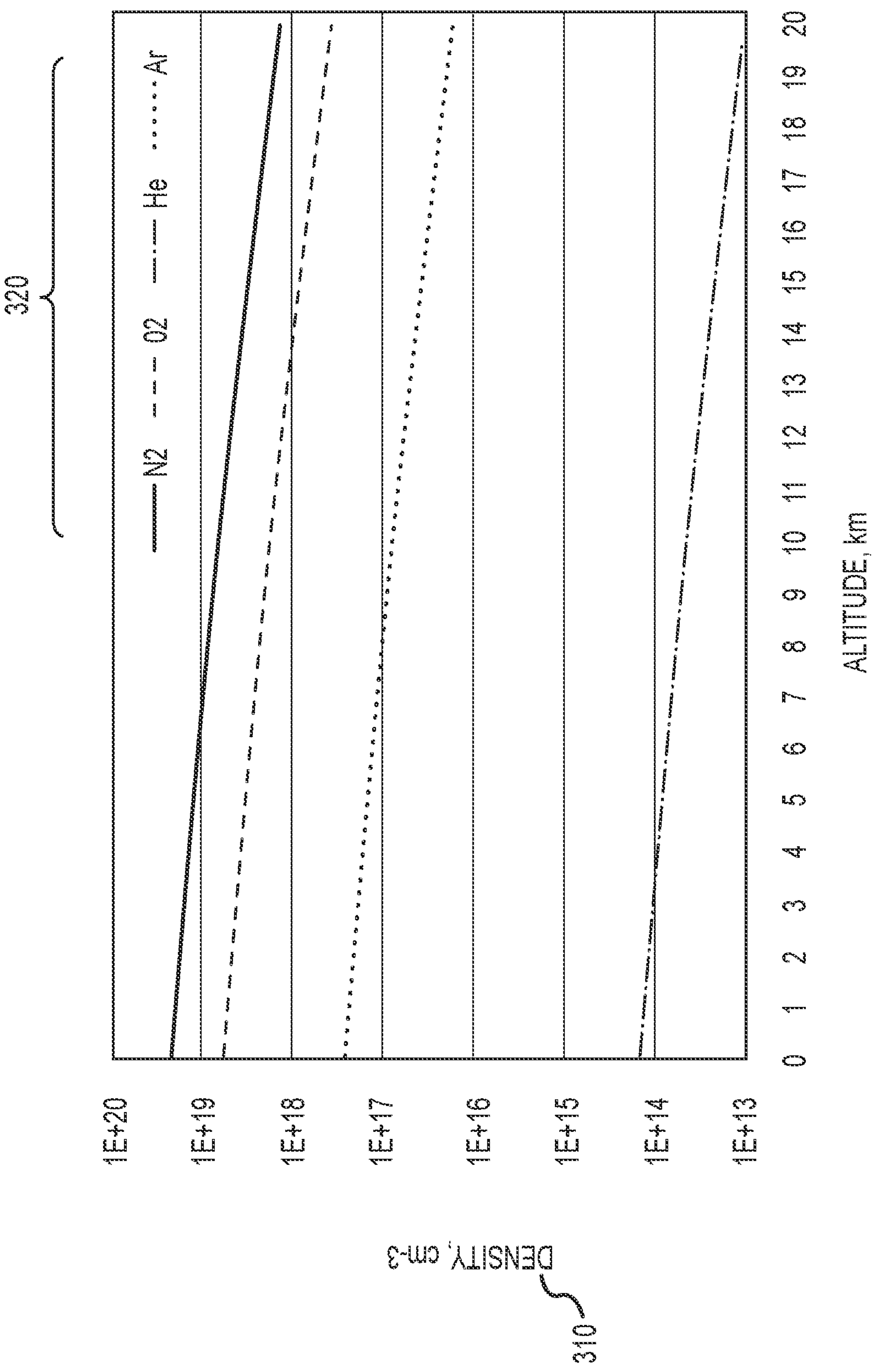
FIGS. 3A and 3B, respectively show the density for the primary constituents of air, as would be known to one of reasonable skill in the relevant art, and general turbulence values as a function of altitude to 20 km.
Figure 3B:
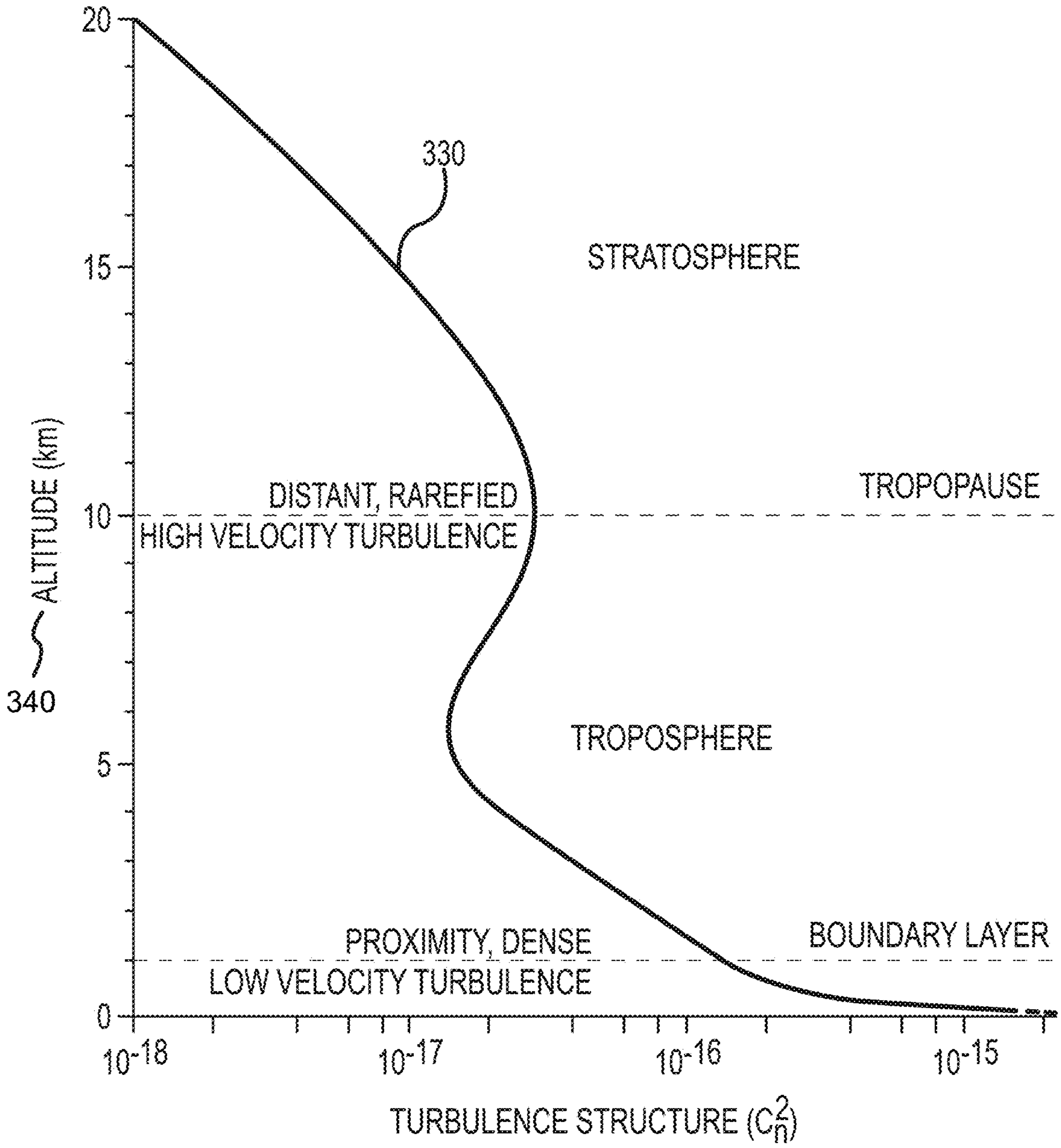

Predicting filamentation onset distance requires values for the critical power, extinction, and turbulence. These values are generally strong functions of altitude, along with the laser beam and optical transmitter parameters. FIGS. 3A and 3B, respectively show the density 310 for the primary constituents 320 of air, as would be known to one of reasonable skill in the relevant art, and general turbulence values 330 as a function of altitude 340 to 20 km. To fully account for an engagement scenario, solutions for filamentation (Beam Collapse) must consider these variations along with altitude and range between the USP delivery system and target.

In one embodiment of the present invention, onset of filamentation is performed with an assumption of a horizontal path at a given altitude and the values for various laser and launch optic parameters such as those given in Table 1. Other scenarios, parameters, and paths are contemplated, and indeed within the scope of the present invention. In this example, the inner length scale for turbulence is 1 mm for all cases. The scaling of critical power ($P_{cr}$) is done versus altitude with density and ranges from 1 to ~15 km. The nonlinear refractive index measured at 10.6 μm includes the delayed molecular response appropriate for ps pulses.

TABLE 1

Values used for estimation of self-focusing distance, left, and approximate scaling of critical power with altitude, right, for a wavelength of 10 μm.

| Parameter | Value | Height, km | $P_{cr}$, GW |
|---|---|---|---|
| Beam Radius, m, $1/e^2$ Intensity | 0.15 | 0 | 300 |
| Pulse Duration, ps | 3 | 5 | 500 |
| $n^{2eff}$, $10^{-23}$ $m^2/W$ | 5 | 15 | 980 |
| Pcr, TW | 0.3 | 20 | 2140 |
| | | | 4600 |

Table 1 shows the effect of increasing $P_{cr}$ with altitude based upon atmospheric density scaling referenced to sea level. The peak power of a pulsed laser is given by the pulse energy divided by the pulse duration. Importantly, the predicted range for onset of filamentation can be controlled/extended by adjusting the power level, exceeding $P_{cr}$. Thus, the laser pulse duration and/or pulse energy can be used, in addition to beam launch optic condition, to adjust the range at which onset of whole beam collapse and/or filamentation occurs. Typically, the laser pulse duration can be controlled by optical dispersion adjustment in an optical compressor while the pulse energy can be controlled by modifying the laser operation and both are therefore largely independent control parameters for system range control.

Figure 4A:
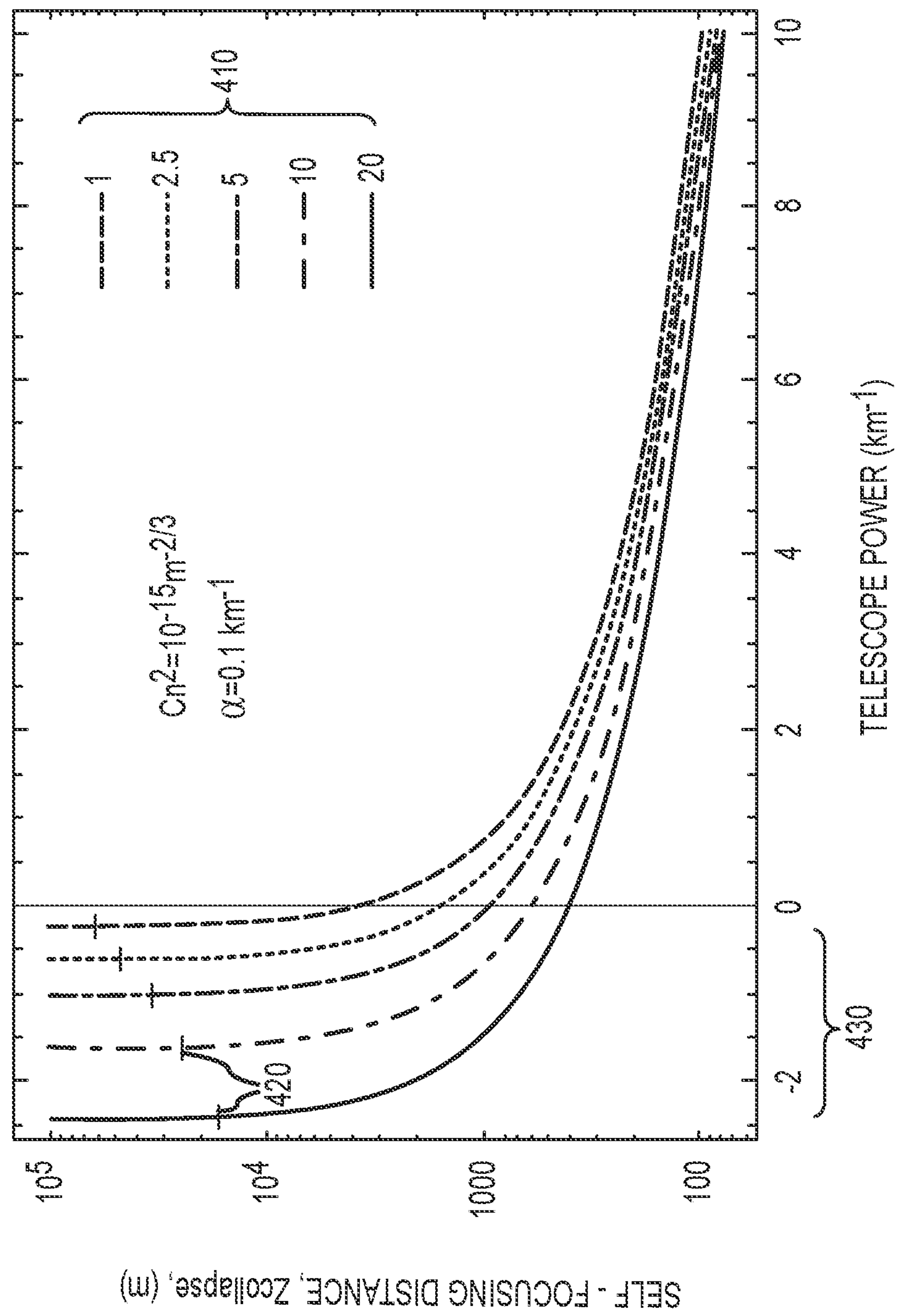
FIGS. 4A and 4B show Self-Focusing Distances (SFD) for a typical low altitude transmission of a USP laser (within the boundary layer region shown in FIG. 3B) and for a moderate altitude of 10 km at several different critical power ratios, according to one embodiment of the present invention.
Figure 4B:
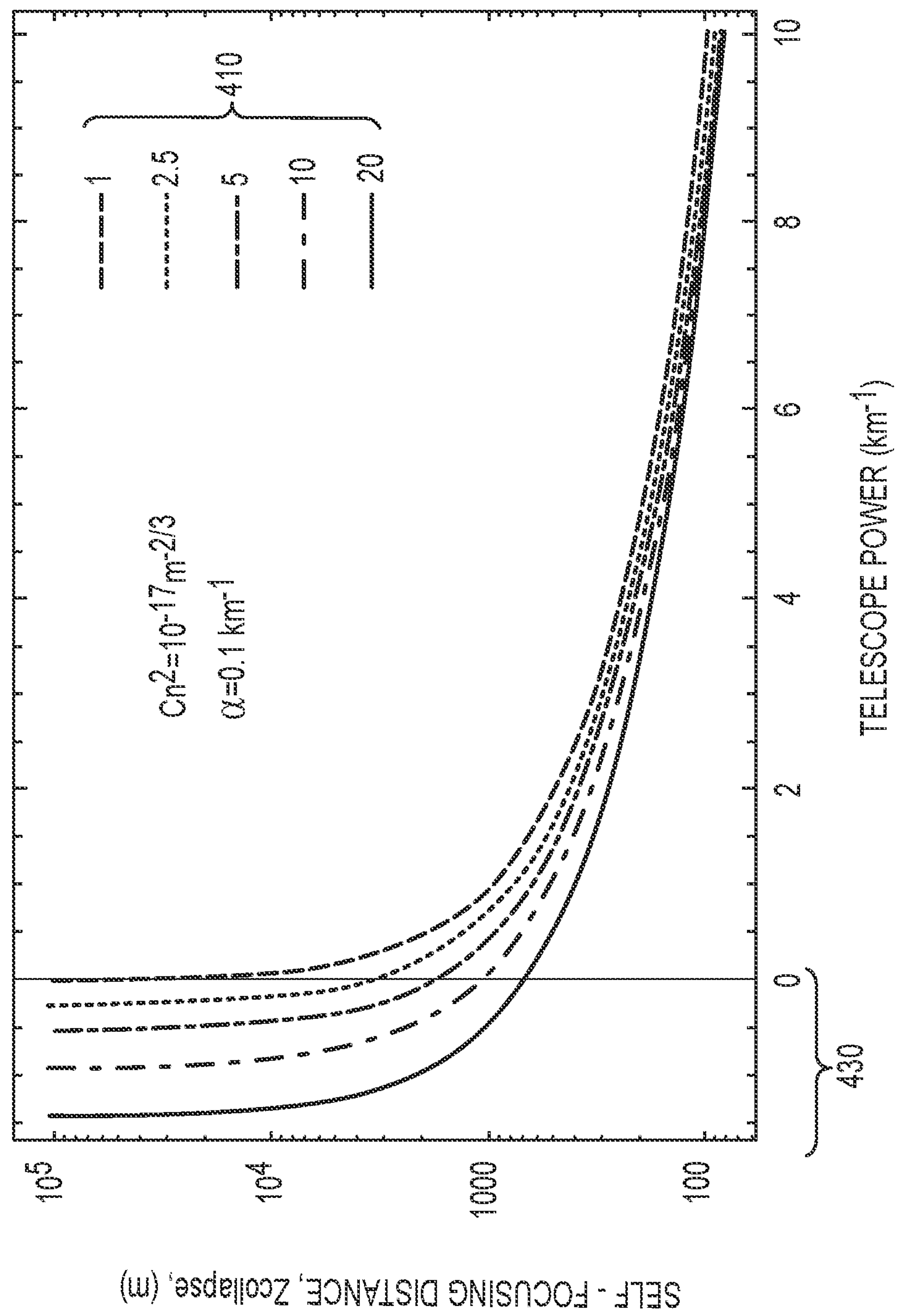

FIGS. 4A and 4B show, respectively, the calculated Self-Focusing Distance (SFD) for a typical low altitude within the boundary layer region shown in FIG. 3B, and for a moderate altitude of 10 km in FIG. 3A at several different critical power ratios. For both cases, increasing the power ratio 410 reduces the SFD 420. By controlling the critical power ratio 410, the SFD 420 can be manipulated. Additionally, low and negative (slightly diverging) telescope powers 430 produce SFD beyond 1 km and up to 100 km or more for all power ratios considered. Again, SFD can be controlled by manipulating optical components. The effects of an increase in altitude, and accompanying reduced air density and increased $P_{cr}$, can be seen by examining and comparing the vertical intercepts of each SFD curve at a given telescope power and relating this to the values of $P_{cr}$ with altitude given in Table 1, or the like. The SFD range is set (controlled), according to one embodiment of the present invention, by a combination of the telescope power and laser critical power ratio allowing for these to be dominant control mechanisms during an engagement.

For example, high peak power lasers in the TW regime at a 10 μm wavelength produce a self-focusing collapse onset at long ranges (10-100 km) for reasonable system and atmospheric conditions. In one version of the present invention, peak powers ranging from 0.3 TW to 6 TW (corresponding to ~1-20 J for a 3 ps pulse), are used. Traceable numerical codes are used to calculate intensity and fluence distributions at the appropriate target ranges and engagement scenarios. These values are then used to determine the effects on the flight stability.

The laser system of the present invention can be implemented to counteract hypersonic missiles by immediately engaging a threat at long range. USP lasers can add debilitating heat to the missile body or the surrounding air it is moving through. A high peak power laser pulse generates a plasma, thereby generating a region of ionized air, and/or from solid materials, and high velocity dispersion away from the core of the beam. By disrupting the flow field around the hypersonic body, the laser generates additional loads on the surface of the missile causing damage or transition to an unstable flight regime. The disrupted flow field also has the potential to interrupt the propulsion system for (air) powered HSVs.

Modeling and simulation efforts of the present invention have shown the effectiveness of the USP laser in defeating a HSV threat. Modeling the scenario with high-fidelity computational models has enabled parameter trade space of the present invention to be defined. Several key parameters include:

Location of the plasma or heating relative to the surface of the hypersonic vehicle Altitude of the vehicle during flight Amount of energy deposited and the resulting forces on the vehicle Size and shape of the plasma region High-fidelity computer codes with simplified modeling approaches address key variables, defining requirements of the laser system. The model delivers a fixed amount of energy from the laser at several ranges from the target point or at different distances along the axis of the laser system. To identify the energy requirements of a laser defense system, the computational model varies the amount of energy delivered and the timing of each pulse. Finally, the model addresses beam-shaping requirements by varying the extent or width of region influenced by the beam. The calculations initially use a two-dimensional (2D) representation of the surrounding flow field, the energy pulse and a cylindrically symmetric target. The 2D calculations model the threat vehicle materials as non-responding, calculate the resultant forces on the vehicle body and the extent and duration of the flow field disruption.

Computational Fluid Dynamics (CFD) is key to analyses of this problem. These CFD codes focus on the fast time scale domain (1 μsec to 1 sec), as compared to longer timescales used to model aerodynamic flow fields of aircraft. Second-order Hydrodynamic Automatic Mesh Refinement Code (SHAMRC) and chemistry-based, first-principles multi-physics code calculate air blast and fragmentation resulting from detonations. SHAMRC is a state-of-the-art hydrocode, providing high-fidelity first-principles calculations providing a basis for the development of fast-running engineering-level models. It supports weapons blast phenomenology and structure loading. In addition, it provides analysis of non-ideal blast effects (urban blast, thermal, terrain, etc.). SHAMRC supports advanced energetics (thermobaric), fuel-air explosives (FAE), and metal-loaded explosive fill development and analysis for agent defeat. SHAMRC is a U.S. government-owned code.

Figure 5A:
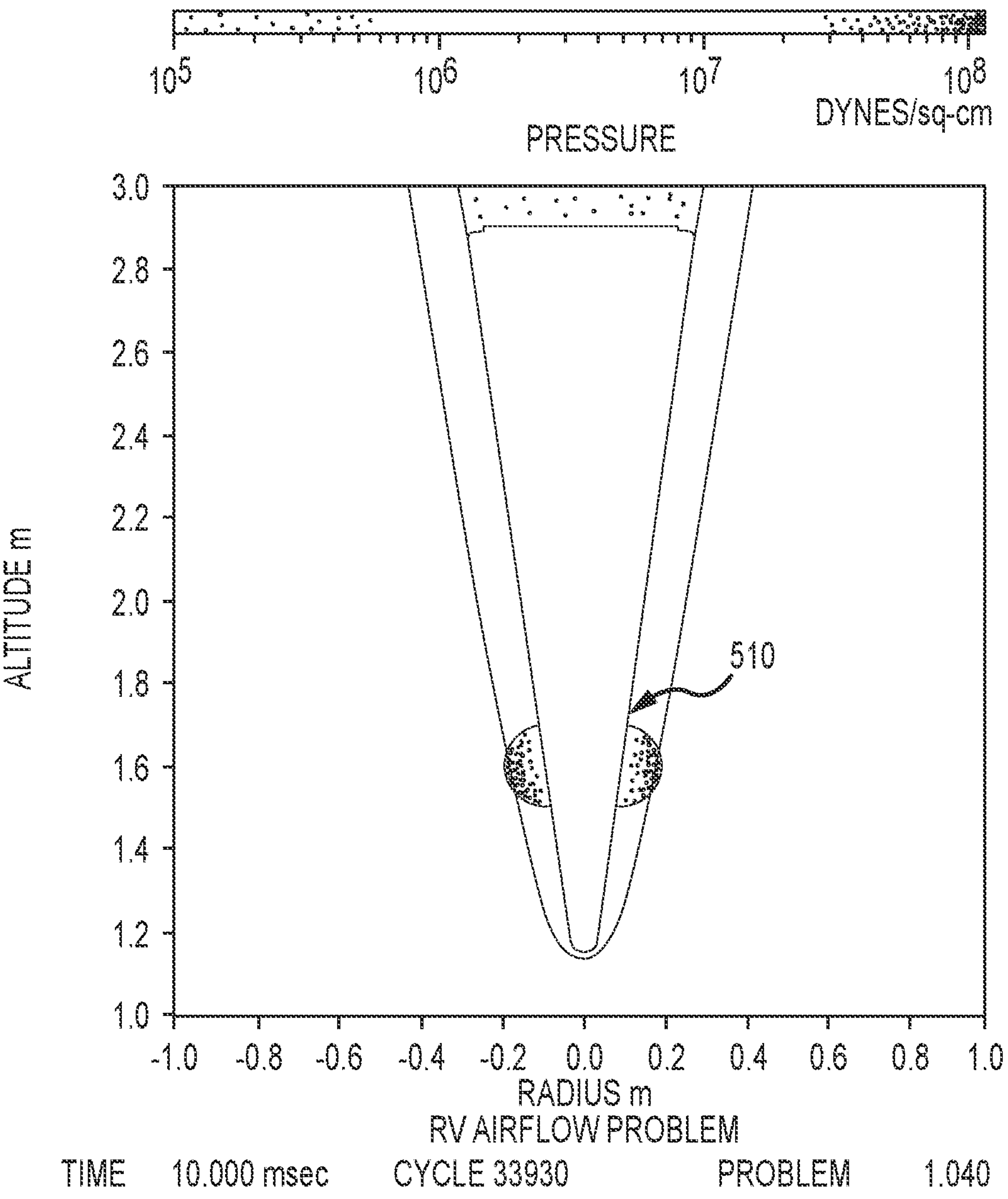
FIGS. 5A-5C show three examples of the interaction of the USP lasers system of the present invention and a high-speed conical vehicle with a shock wave.
Figure 5B:
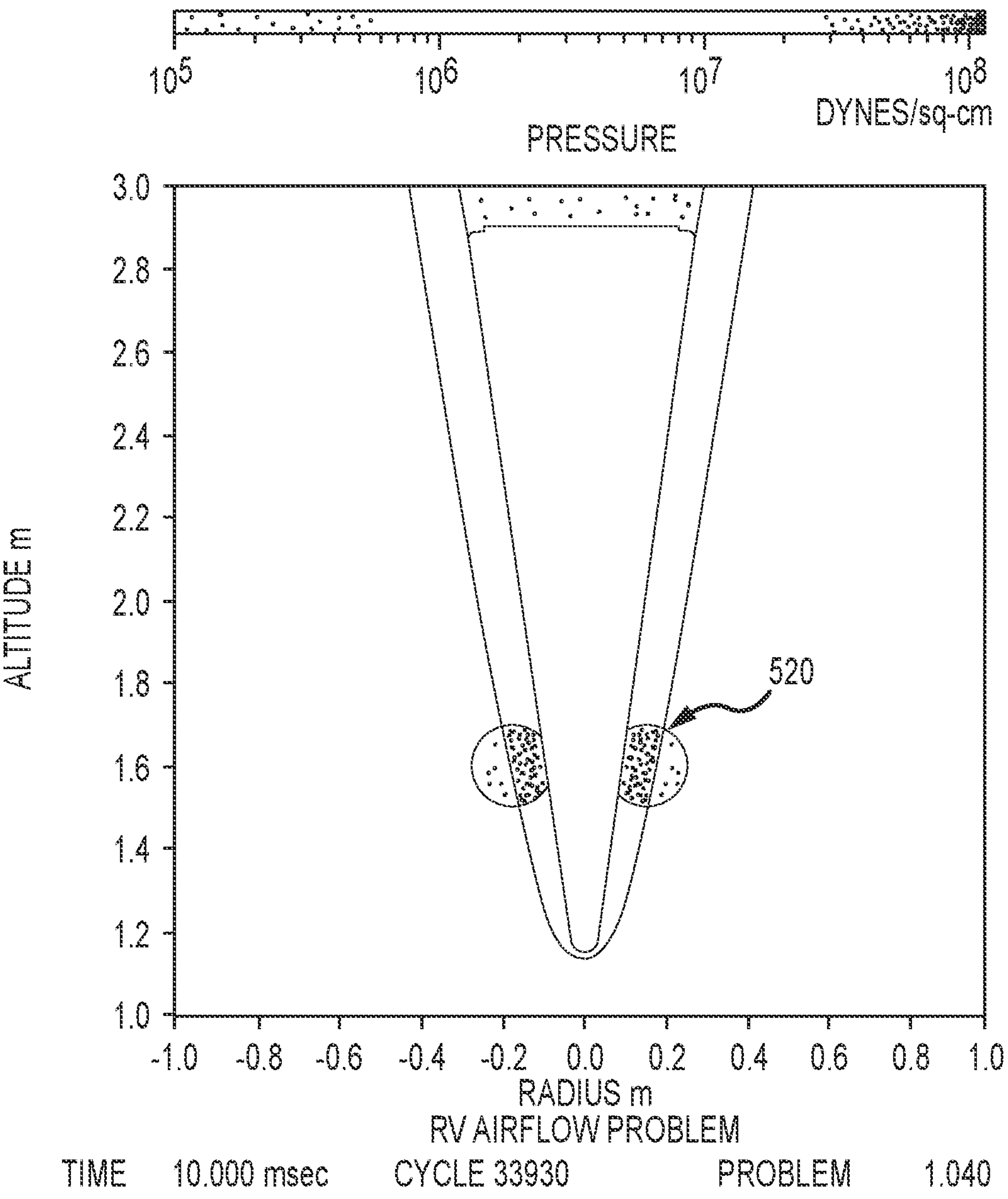
Figure 5C:
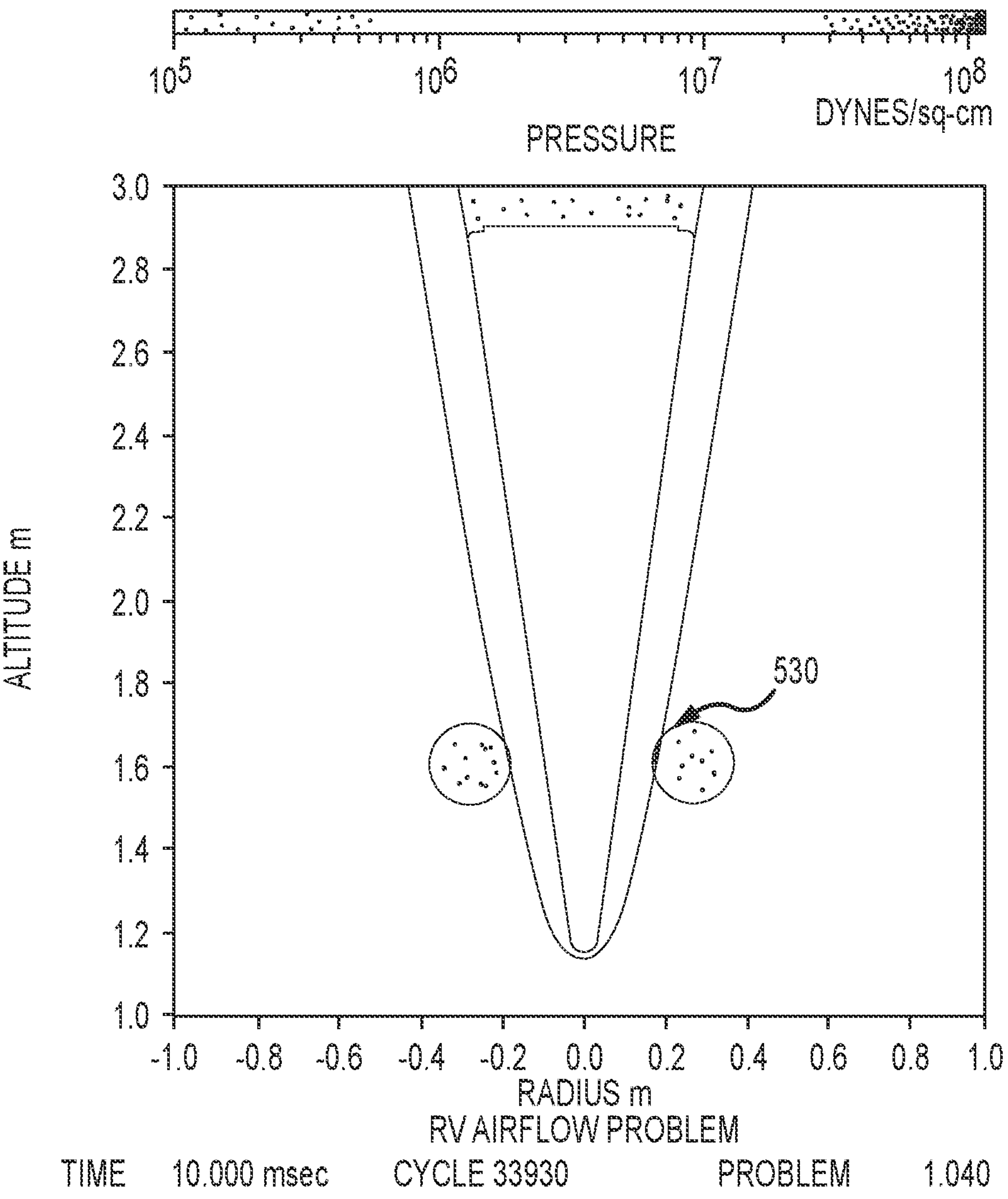

USP Laser data of the present invention was modeled in 2D to show the feasibility of using the SHAMRC code. A simple calculation confirms the influence of laser deposition of energy near the surface of an HSV. The feeding boundary condition was V=3048 m/s (10000 ft/s, ~Mach 10), sea level density (ρ=1.225 g/cm3), cone angle of 16.5°, and 2D axisymmetric. A 200 mJ/pulse of energy was deposited with a 100 ps pulse duration over a 20 cm diameter by 3 cm long cylinder. As shown in FIGS. 5A-5C, the energy was located at three positions; on the surface 510, centered 520 on the shock wave and tangent 530 to the shock wave. FIGS. 5A-5C show three cases of interaction of the USP of the present invention and a high-speed conical vehicle with shock wave.

Figure 6A:
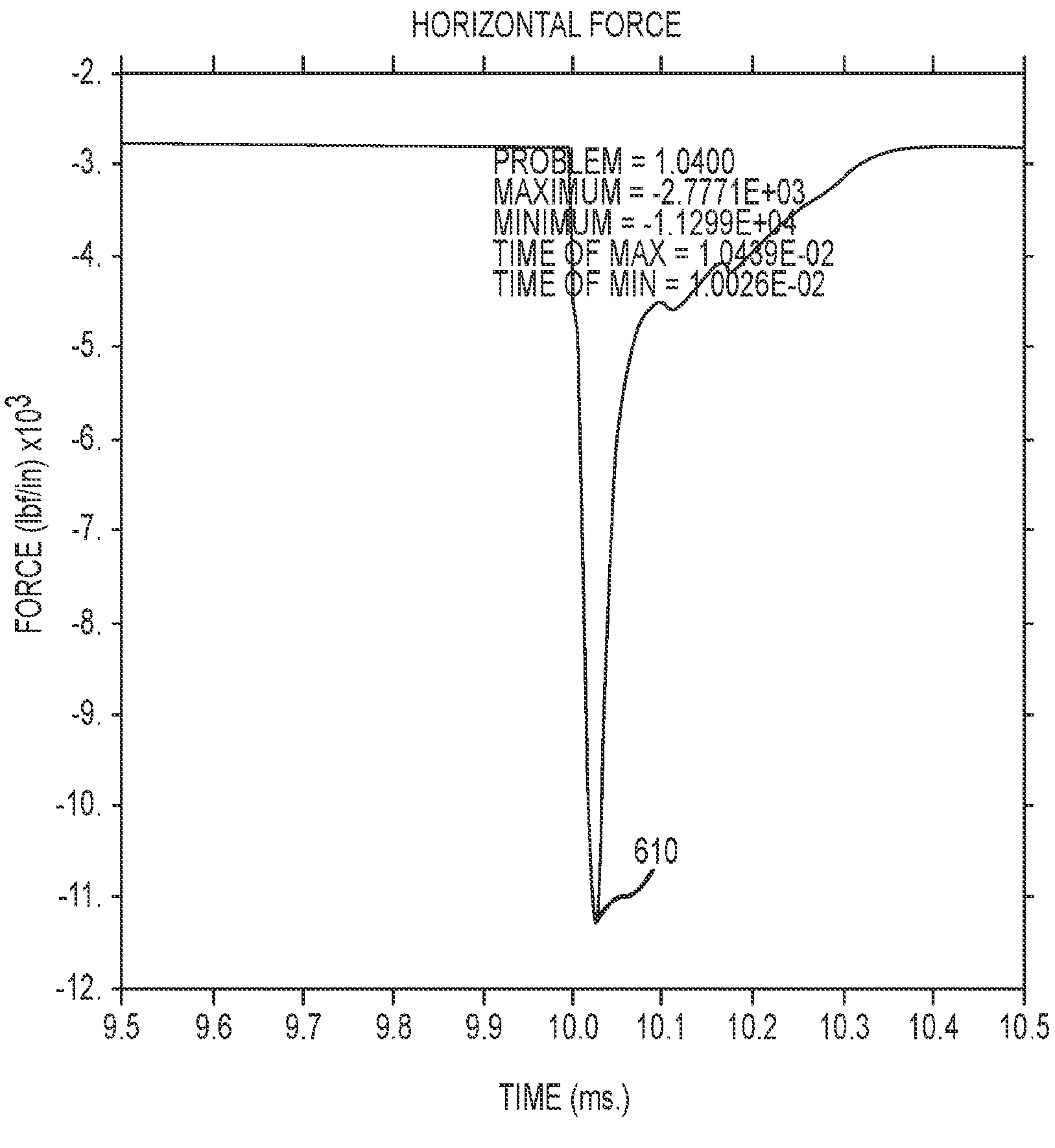
FIGS. 6A-6C show resulting horizontal force changes due to the USP laser interaction with the vehicle of FIG. 5, respectively, according to one embodiment of the present invention.
Figure 6B:
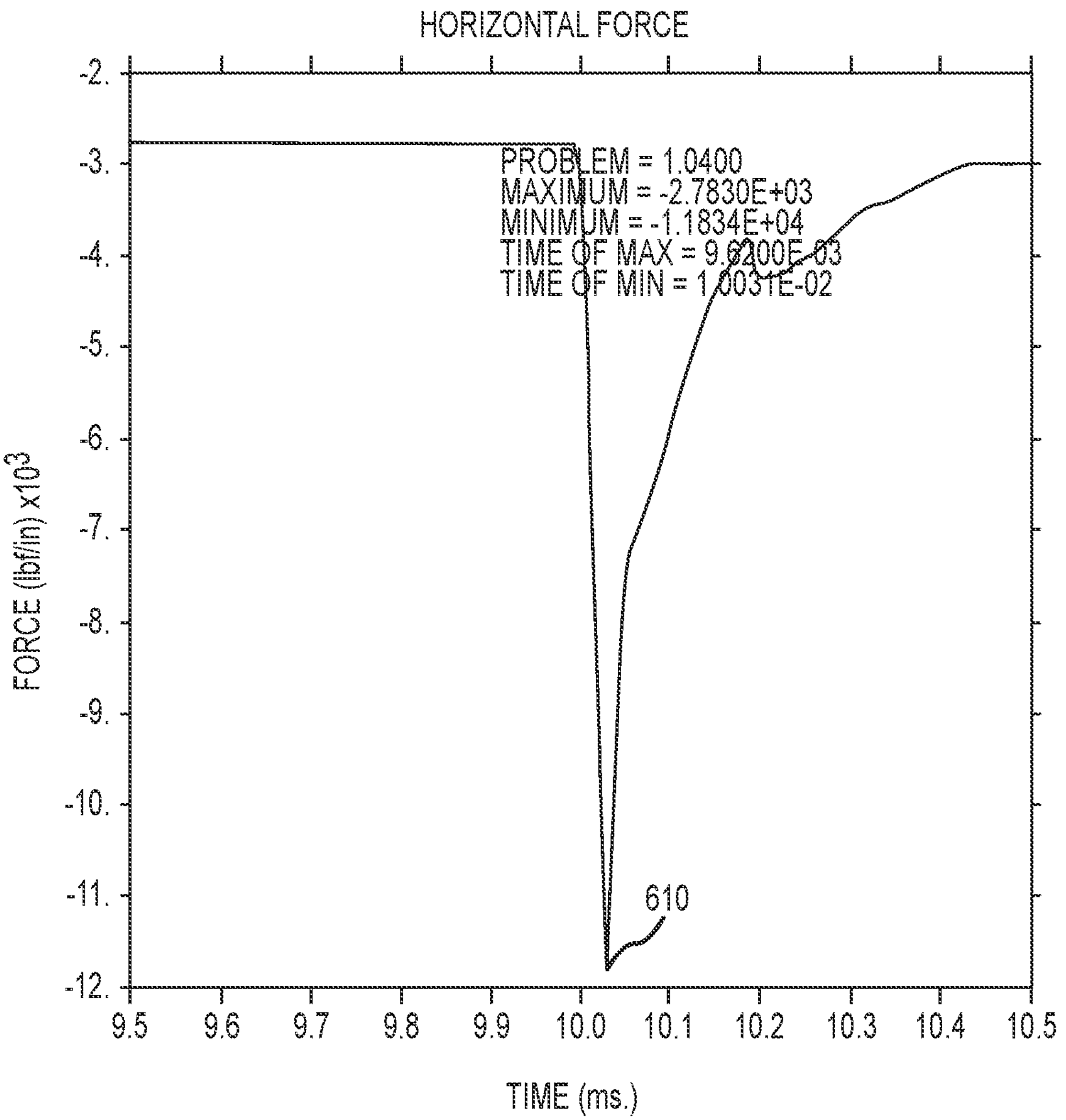
Figure 6C:
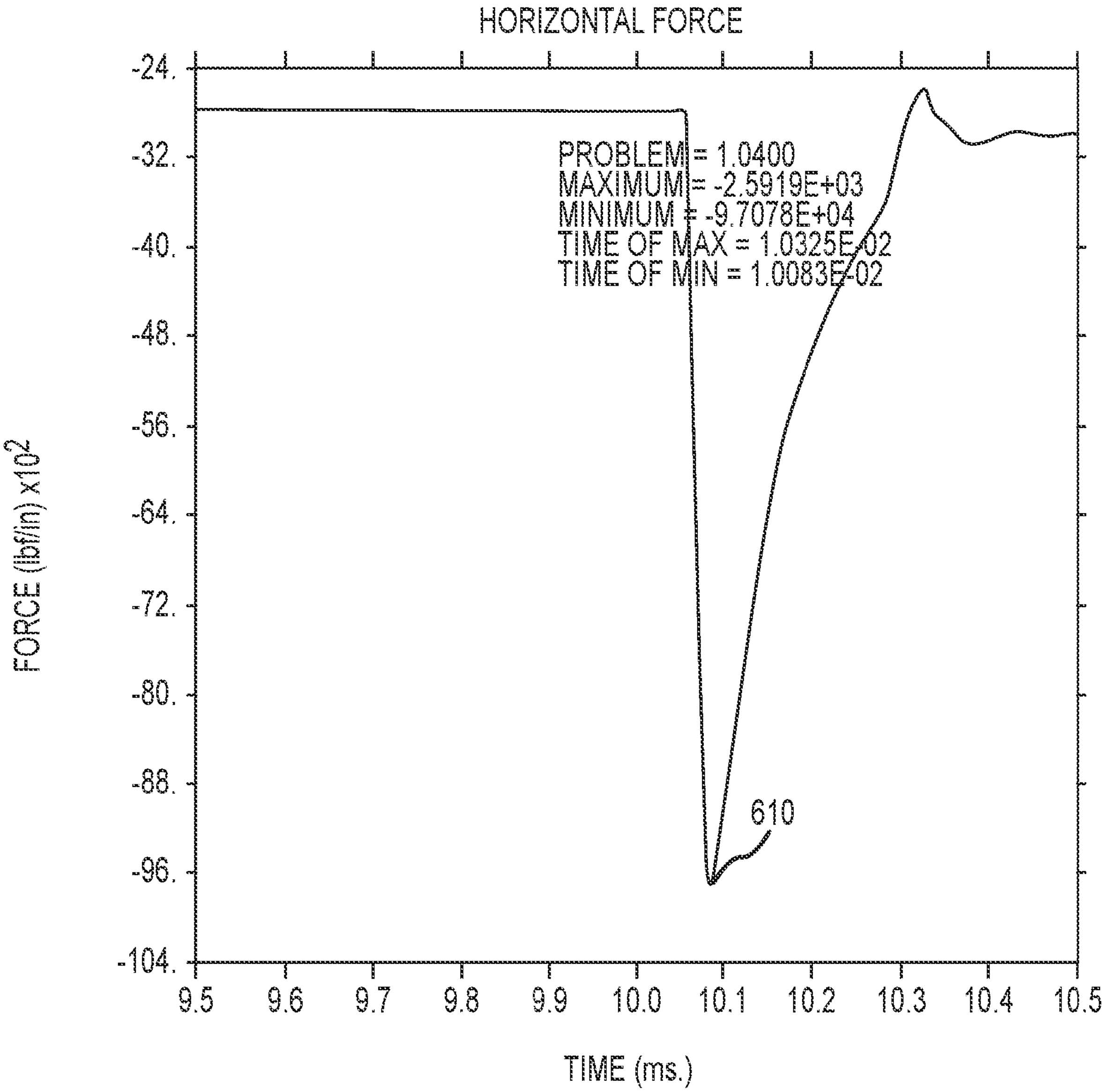

For each case, pressure, temperature, and velocity vectors were calculated. The results showed the impact of the energy deposition on the shock wave by the USP laser. The resulting forces were calculated to show the change in force when the energy deposition was present. FIGS. 6A-6C show, respectively, the horizontal forces 610 placed on the high-speed vehicle because of USP laser interaction as a function of time. Note that there is significant force change during the laser pulse.

Another feature of the present invention is that significant flow control and reactive forces can be created by laser-air breakdown and electrical spark discharges in air preceding or surrounding a HSV. The breakdown and reactive forces in the air can disrupt HSV stability.

One version of the present invention uses high peak intensity laser pulses to create a plasma shock wave in the hypersonic flow fields surrounding hypersonic targets. According to one embodiment of the present invention the process is seeded with a laser pulse at the front of the target, using the energy in the flow field to grow the instability along the length of the target. A high pulse repetition rate is used forming burst packets to create multiple expanding plumes along the length of the target. High peak power lasers (ps class pulse durations or the like) are used with a burst mode pulse train to increase the plasma temperature. The resulting high surface temperature of hypersonic vehicles decreases ablation threshold thereby increasing efficacy.

Another feature of the present invention is its ability to directly couple into the outer target material using laser ablation. One version of the present invention generates a material and air plasma plume. For example, a room temperature ablation threshold ~$10^{12}$ W/cm$^2$ using the self-focusing USP laser system of the present invention, at long range, can increase plasma density surrounding the HSV compared to the otherwise relatively low-density air-sheath plasma since the laser of the present invention is adding material (plasma). Above the ablation threshold results are largely material independent.

Another aspect of the present invention is the coupling of laser pulses into the plasma sheath. The laser generates primarily an additional heating of air plasma plume within the existing plasma sheath using strong laser plasma coupling and long laser wavelengths.

$$\left.\begin{array}{l}\text{Plasma electron } \mathit{freq.},\ f^{\wedge} \\ n_e \text{ for high altitude plasma; } 10^{17}-10^{20}\end{array}\right\} \begin{array}{c}CO_2 \text{ laser at 10 um} \\ \text{wavelength is 30 THz}\end{array}$$

$$n_e \text{ for single shot laser ablation; } \sim \left.\right\} \begin{array}{c}\text{Increase in plasma} \\ \text{frequency using ablated} \\ \text{material}\end{array}$$

At a range of 500 km or greater using lasers with linear focusing results in large beam diameters that does not allow USP ablation thresholds to be reached at a target surface. Nonlinear whole beam collapse (self-focusing) at long wavelengths (10 micron) and short pulse durations (~ps) of the present invention dramatically reduce beam diameters at a target range and a high-altitude engagement can increase effectiveness of long range nonlinear focusing due to reduced air density and lower Atmospheric effects. Moreover, temporal focusing via chirped pulse atmospheric compression can decrease onset of self-focusing and increase peak intensity at Target.

Another aspect of the present invention is the recognition that interaction of whole beam collapse of a USP laser with a target (HSV) emits secondary radiation. As the radiation varies based on the interaction with the target, plasma sheath, shockwaves, etc., and as it can be observed in real time, the secondary radiation can be used to refine the mechanism(s) controlling the whole beam collapse. According to one embodiment of the present invention, received secondary radiation is used to refine one or more optical lens in the optical wavefront controlling element and/or the generation of the USP laser. Specifically, the lens can be refined in conjunction with the ratio of peak power to critical power level to place the whole beam collapse at precisely the desired position on the target. The process can be ongoing as range varies and as atmospheric conditions change.

Figure 7:
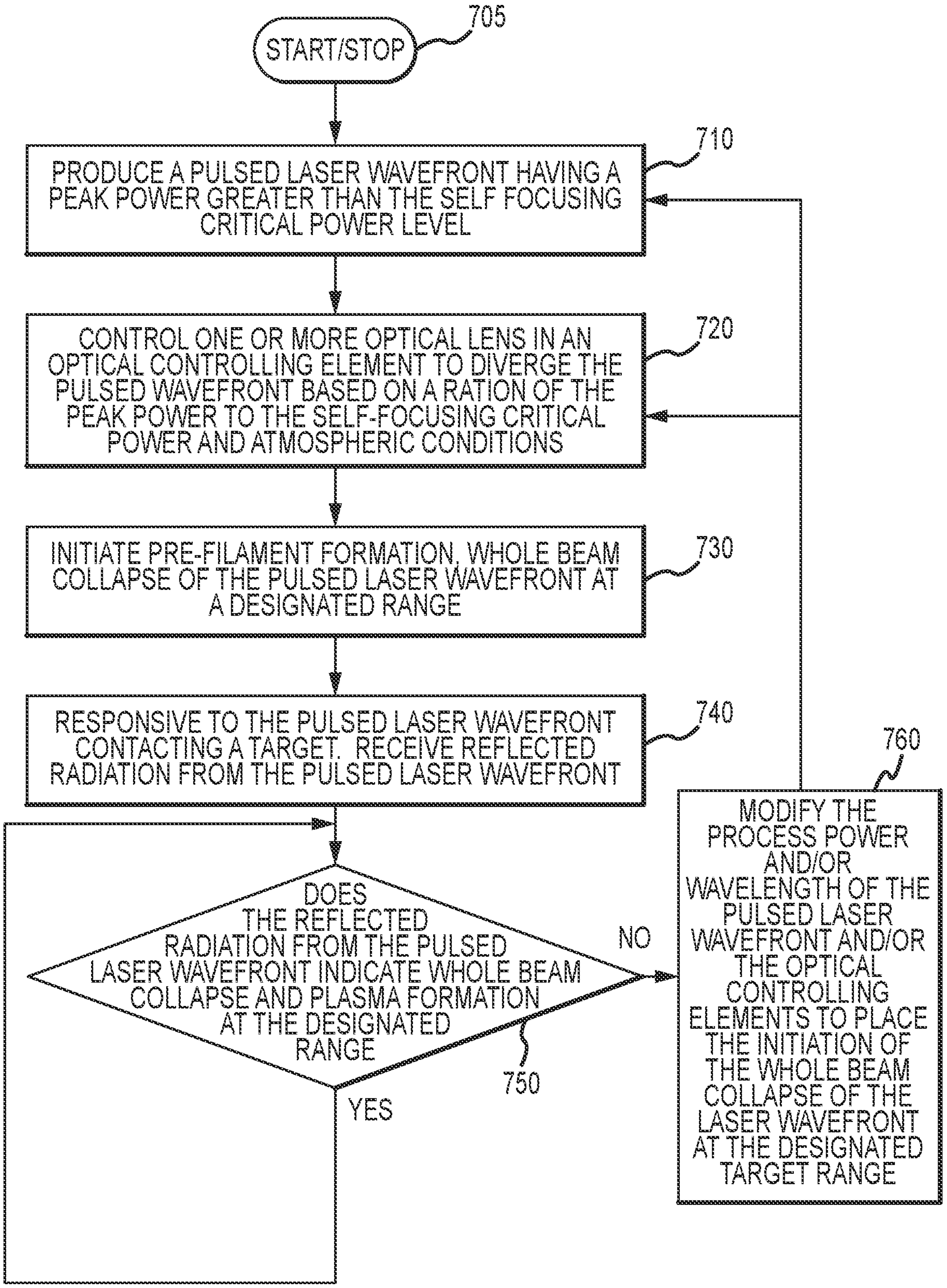
FIG. 7 presents a flowchart of one methodology embodiment of the present invention for forming a collapsed ultra-short pulse laser beam at a designated range.

FIG. 7 provides a flow chart of a methodology for generating a range specific thermal plasma. The process begins 705 by producing 710 a pulsed laser wavefront. In one embodiment the wavefront is an Ultra Short Pulsed wavefront on the order of 1-10 μm in wavelength. In each case, the pulsed laser has a peak power exceeding the atmospheric self-focusing critical power level. The wavefront is channeled through one or more optical lens 720 of an optical wavefront controlling element causing the wavefront to diverge. The degree of divergence, or convergence, is based on a ratio of the peak power of the pulsed laser to the self-focusing critical power level, and atmospheric conditions.

The resultant divergent, or convergent, self-focusing pulsed laser wavefront, according to one embodiment of the present invention, initiates 730 whole beam collapse at a designated range. Upon interaction with an object at the designated range, the pulsed laser wavefront forms a plasma. Moreover, interaction between the object and the pulsed laser wavefront creates 740 secondary radiation which can be received by the optical wavefront controlling element and the source of the pulsed wavefront. Upon determining 750 whether the whole beam collapse has occurred at the designated ranged based on received secondary radiation, the system can iteratively modify 760 the pulsed laser wavefront and/or the optical controlling elements to place the initiation of whole beam collapse of the laser wavefront at a designated target range.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Likewise, the naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

It is recognized that the teachings of the foregoing disclosure will suggest other modifications to those persons skilled in the relevant art. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for generating a range specific thermal plasma, comprising:

a pulsed laser configured to produce a pulsed wavefront at a peak power, the peak power exceeding a self-focusing critical power level; and an optical wavefront controlling element having one or more optical lens configured to diverge the pulsed wavefront based on a ratio of the peak power to the self-focusing critical power level, and an atmospheric condition thereby initiating whole beam collapse at a designated range.

2. The system for generating a range specific thermal plasma according to claim 1, wherein the whole beam collapse forms a plasma upon interaction with an object.

3. The system for generating a range specific thermal plasma according to claim 2, wherein the plasma emits a secondary radiation and wherein the wavefront controlling element is configured to receive the secondary radiation and modify the one or more optical lens or the peak power refining formation of the plasma.

4. The system for generating a range specific thermal plasma according to claim 2, wherein the plasma disrupts airflow surrounding a hypersonic vehicle.

5. The system for generating a range specific thermal plasma according to claim 2, wherein the object is a hypersonic vehicle.

6. The system for generating a range specific thermal plasma according to claim 1, wherein the atmospheric condition initiates pulsed wavefront self-focusing.

7. The system for generating a range specific thermal plasma according to claim 1, wherein the designated range is equal or greater than 100 km.

8. The system for generating a range specific thermal plasma according to claim 1, wherein the designated range is equal or greater than 50 km.

9. The system for generating a range specific thermal plasma according to claim 1, wherein the peak power of the pulsed wavefront is greater than ten times the self-focusing critical power.

10. The system for generating a range specific thermal plasma according to claim 1, wherein the peak power of the pulsed wavefront is greater than five times the self-focusing critical power.

11. The system for generating a range specific thermal plasma according to claim 1, wherein the pulsed laser is an ultra-short pulsed laser with a wavelength of 10 um or less.

12. The system for generating a range specific thermal plasma according to claim 11, wherein the peak power of the ultra-short pulsed laser greater than or equal to 1 TW.

13. A method for generating a range specific thermal plasma, comprising:

producing a pulsed laser wavefront by a pulsed laser, the pulsed laser wavefront having a peak power exceeding a self-focusing critical power level; and controlling one or more optical lens in an optical wavefront controlling element to diverge the pulsed wavefront based on a ratio of the peak power to the self-focusing critical power level and an atmospheric condition; and initiating whole beam collapse of the pulsed laser wavefront at a designated range.

14. The method for generating a range specific thermal plasma according to claim 13, further comprising forming a plasma at the designated range upon interaction with an object.

15. The method for generating a range specific thermal plasma according to claim 14, further comprising emitting, by interaction between the plasma and the object, a secondary radiation.

16. The method for generating a range specific thermal plasma according to claim 15, further comprising receiving, by the wavefront controlling element, the secondary radiation and modifying, by the wavefront controlling element, the one or more optical lens, based on the secondary radiation, refining formation of the plasma with the object.

17. The method for generating a range specific thermal plasma according to claim 14, further comprising disrupting, by the plasma, airflow surrounding a hypersonic vehicle.

18. The method for generating a range specific thermal plasma according to claim 14, wherein the object is a hypersonic vehicle.

19. The method for generating a range specific thermal plasma according to claim 13, further comprising initiating pulsed wavefront self-focusing.

20. The method for generating a range specific thermal plasma according to claim 13, wherein the designated range is equal or greater than 100 km.

21. The method for generating a range specific thermal plasma according to claim 13, wherein the designated range is equal or greater than 50 km.

22. The method for generating a range specific thermal plasma according to claim 13, further comprising configuring the peak power of the pulsed wavefront to be greater than ten times the self-focusing critical power.

23. The method for generating a range specific thermal plasma according to claim 13, further comprising configuring the peak power of the pulsed wavefront to be greater than five times the self-focusing critical power.

24. The method for generating a range specific thermal plasma according to claim 13, wherein the pulsed laser is an ultra-short pulsed laser with a wavelength of 10 um or less.

25. The method for generating a range specific thermal plasma according to claim 24, wherein the peak power of the ultra-short pulsed laser greater than or equal to 1 TW.

* * * * *